(12) United States Patent
Fraley et al.

(10) Patent No.: US 11,377,076 B1
(45) Date of Patent: Jul. 5, 2022

(54) AIR POWERED LANDING GEAR

(71) Applicant: King Kutter II, Inc., Gallipolis, OH (US)

(72) Inventors: J. Phillip Fraley, Winfield, AL (US); John W. Davis, III, Winfield, AL (US)

( * ) Notice: Subject to any disclaimer, the term of this patent is extended or adjusted under 35 U.S.C. 154(b) by 0 days.

(21) Appl. No.: 16/819,601

(22) Filed: Mar. 16, 2020

Related U.S. Application Data

(60) Provisional application No. 62/818,560, filed on Mar. 14, 2019.

(51) Int. Cl.
*B60S 9/10* (2006.01)

(52) U.S. Cl.
CPC ....................... *B60S 9/10* (2013.01)

(58) Field of Classification Search
CPC ......................................................... B60S 9/10
See application file for complete search history.

(56) References Cited

U.S. PATENT DOCUMENTS

| | | | | |
|---|---|---|---|---|
| 1,840,666 A * | 1/1932 | Grundon | ................. | E02F 9/085 280/765.1 |
| 1,868,021 A * | 7/1932 | Nabors | .............. | B62D 53/0857 280/763.1 |
| 1,868,971 A * | 7/1932 | Davis | ...................... | B60D 1/66 254/419 |
| 2,016,468 A * | 10/1935 | Wagner | .................... | B60S 9/20 254/419 |
| 2,969,249 A * | 1/1961 | Fox | .......................... | A47B 1/04 403/94 |
| 3,007,677 A * | 11/1961 | Dalton | ..................... | B60S 9/06 254/419 |
| 3,081,065 A * | 3/1963 | Dalton | ..................... | B60D 1/66 254/419 |
| 3,182,957 A * | 5/1965 | Dalton | ..................... | B60S 9/04 254/419 |
| 3,236,501 A * | 2/1966 | McKay | ..................... | B60S 9/06 254/419 |
| 3,255,995 A * | 6/1966 | Bartlett | .................... | B60D 1/66 254/419 |
| 3,536,337 A * | 10/1970 | Molnar | ..................... | B60S 9/10 280/764.1 |
| 3,589,748 A * | 6/1971 | Miller | ...................... | B60S 9/10 280/765.1 |
| 3,682,497 A * | 8/1972 | Dalton | ..................... | B60S 9/04 254/419 |
| 3,781,035 A * | 12/1973 | Petersson | .................. | B60S 9/02 280/764.1 |
| 3,790,190 A * | 2/1974 | Davis | ........................ | B60S 9/18 280/430 |
| 3,801,068 A * | 4/1974 | Kopas | ....................... | B60S 9/00 254/419 |

(Continued)

*Primary Examiner* — Jacob B Meyer
(74) *Attorney, Agent, or Firm* — Angela Holt; Bradley Arant Boult Cummings LLP

(57) ABSTRACT

An air powered landing gear supports a front end a trailer when it is deployed. A cylindrical rod is secured to an underside of the trailer, and a collar assembly rotates around the rod. A leg assembly is rigidly affixed to and extends downwardly from the collar assembly. A pneumatic cylinder extends between the trailer and the leg assembly and is configured to rotate the landing gear from a deployed position, wherein the landing gear supports the front end of the trailer, to a stowed position, wherein the landing gear is rotated upwardly toward the trailer.

8 Claims, 3 Drawing Sheets

(56) References Cited

U.S. PATENT DOCUMENTS

| | | | | |
|---|---|---|---|---|
| 3,844,582 A * | 10/1974 | Cook | ................ | B60S 9/10 280/764.1 |
| 3,874,696 A * | 4/1975 | Gardner | ............ | B62D 53/0857 254/419 |
| 3,951,383 A * | 4/1976 | Tenney, Jr. | ................ | B60S 9/04 254/94 |
| 3,984,082 A * | 10/1976 | Boettcher | ................ | B60S 9/04 254/426 |
| 4,108,472 A * | 8/1978 | Weir | ................ | B60S 9/04 280/763.1 |
| 4,211,299 A * | 7/1980 | Schulte | ................ | B60S 9/20 180/200 |
| 4,281,852 A * | 8/1981 | Konkle | ................ | B60S 9/12 280/766.1 |
| 4,466,637 A * | 8/1984 | Nelson | ................ | B60S 9/04 254/419 |
| 5,050,845 A * | 9/1991 | Aline | ................ | B60S 9/12 254/419 |
| 5,137,297 A * | 8/1992 | Walker | ................ | B60D 1/54 280/124.129 |
| 5,217,209 A * | 6/1993 | Anders | ................ | B60S 9/12 254/419 |
| 5,711,504 A * | 1/1998 | Cusimano | ................ | B60S 9/08 248/354.3 |
| 5,911,437 A * | 6/1999 | Lawrence | ................ | B60S 9/10 280/766.1 |
| 6,895,648 B1 * | 5/2005 | Willett | ................ | B60S 9/12 254/423 |
| 7,398,959 B2 * | 7/2008 | VanDenberg | ............ | B60S 9/08 254/2 R |
| 8,827,309 B1 * | 9/2014 | Ouellet | ................ | B60S 9/08 280/763.1 |
| 2005/0073141 A1 * | 4/2005 | Baird | ................ | B60S 9/08 280/766.1 |
| 2006/0163859 A1 * | 7/2006 | Lehman | ................ | B60S 9/10 280/764.1 |
| 2010/0213429 A1 * | 8/2010 | Drake | ................ | B66F 7/10 254/89 R |
| 2013/0334480 A1 * | 12/2013 | Daniel | ................ | B60S 9/12 254/419 |
| 2015/0224967 A1 * | 8/2015 | Rensink | ................ | B66F 3/30 254/93 R |

* cited by examiner

AIR POWERED LANDING GEAR

REFERENCE TO RELATED APPLICATIONS

This application claims priority to Provisional Patent Application U.S. Ser. No. 62/818,560, entitled "Air Powered Landing Gear" and filed on Mar. 14, 2019, which is fully incorporated herein by reference.

BACKGROUND AND SUMMARY

A landing gear deploys to support a trailer when the trailer is not supported by a tractor, and rotates out of the way when not in use. The landing gear is transferred from a deployed position to a stowed position by a pneumatic cylinder. The landing gear is deployed when air is removed from the cylinder, and gravity causes the landing gear to deploy.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
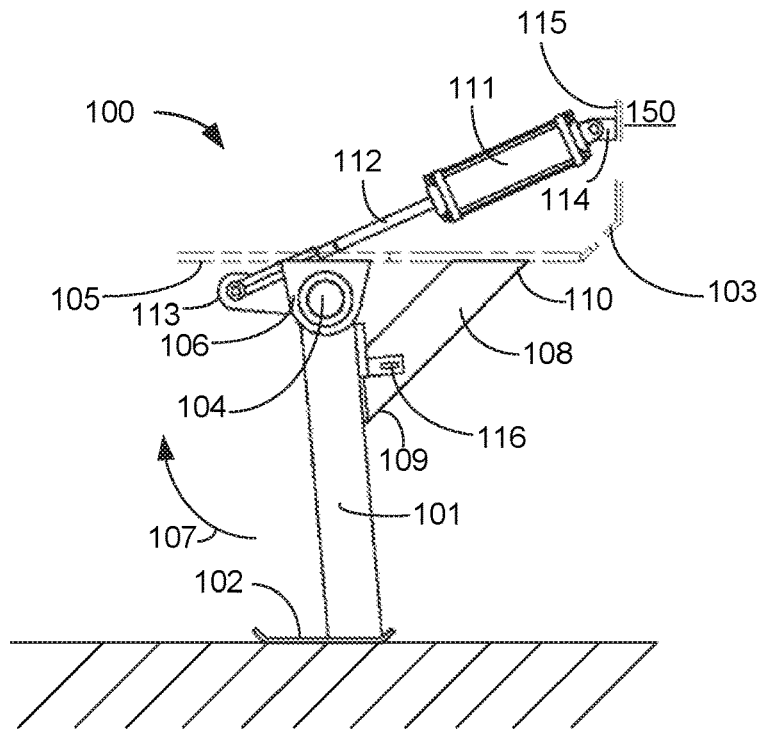
FIG. 1 is a side plan view of an air powered landing gear affixed to a front end of a trailer.

FIG. 1 is a side plan view of an air powered landing gear 100 affixed to a front end 103 of a trailer (not shown). FIG. 1 depicts the landing gear 100 in a deployed position. The landing gear 100 comprises two legs 101 (only one of which is shown in FIG. 1) extending downwardly from and rotatable around a rod 104, the rod 104 secured by a plurality of brackets 106 to an underside 105 of the trailer. In the illustrated embodiment, two brackets 106 support the rod 104 on opposed ends of the rod 104.

A pad 102 extends between the legs 101 and contacts the ground when the landing gear 100 is in the deployed position as shown. The legs 101 rotate in the direction indicated by directional arrow 107 to move the landing gear 100 from the deployed position to a stowed position.

A stop beam 108 extends from each of the legs 101 upwards and forward at an angle. A lower end 109 of each stop beam 108 is welded to the leg 101, and an upper end 110 of each stop beam 108 contacts the underside 105 of the trailer when the landing gear 100 is deployed as illustrated.

A pneumatic cylinder 111 moves the landing gear 100 from the deployed position to the stowed position. The pneumatic cylinder 111 comprises a rod 112 that extends from the cylinder 111 and is rotatably affixed to an extension 113. The extension 113 extends from a central collar 121 (FIG. 5) The rod 112 of the cylinder 111 pulls the landing gear 100 into the stowed position. When air pressure is removed from a retract port of the cylinder, gravity causes the landing gear to deploy.

A spring (not shown) attaches to a tab 116 and pulls the landing gear 101 all the way forward against the stop beams 108 when the air pressure is removed from the cylinder, assisting in the deploying of the landing gear.

The pneumatic cylinder 111 is rotatably affixed to the trailer via a bracket 114, the bracket 114 attached to a cross member 150 welded to the main frame (not shown) of the trailer.

Figure 2:
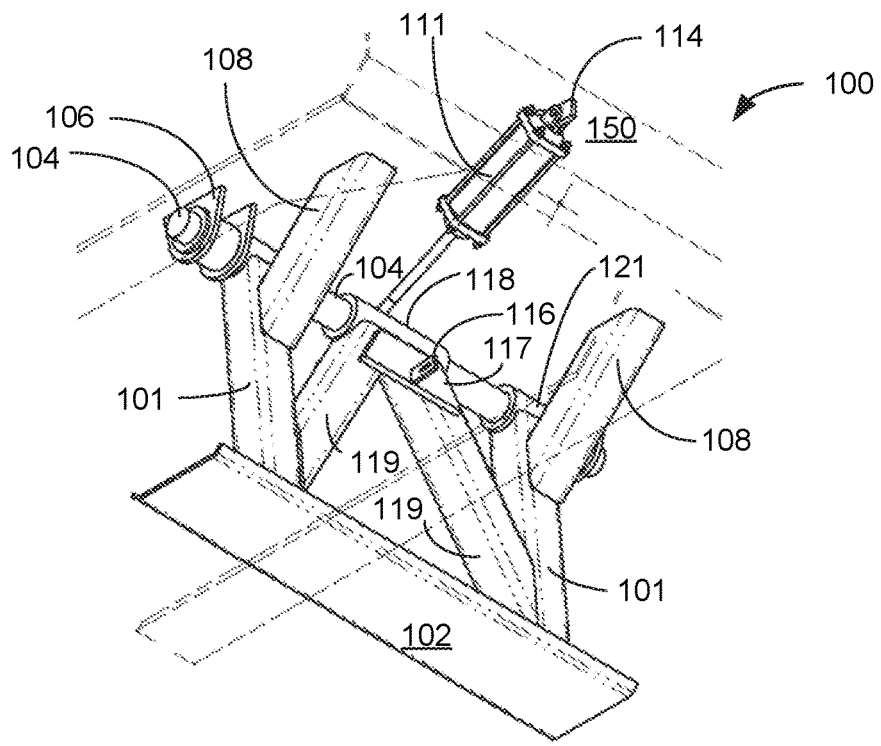
FIG. 2 is a bottom perspective view of the landing gear of FIG. 1.

FIG. 2 is a bottom perspective view of the landing gear 100 of FIG. 1, still in a deployed position. An outer collar 121 is disposed on opposite ends of the rod 104 and rotates on the rod 104, as further discussed herein. The legs 101 are rigidly affixed to the outer collar 121 at the upper ends of the legs 101, by welding in one embodiment. A central collar 118 is disposed at a center of the rod 104 and rotates on the rod 104. The central collar 118 is rigidly affixed to angled braces 119 that extend between the central collar 118 and the legs 101. In this regard, upper ends of the angled braces 119 are affixed to the central collar 118 and lower ends of the angled braces 119 are affixed to lower ends of the legs 101. The extension 113 (FIG. 1) extends rearwardly from the central collar 118. The angled braces 119 serve to stiffen the landing gear 100.

A support plate 117 is rigidly affixed to the angled braces 119 on a forward side of the braces 119. The tab 116 extends from the support plate 117.

The bracket 114 is affixed to the cross member 150 and supports the pneumatic cylinder 111.

Figure 3:
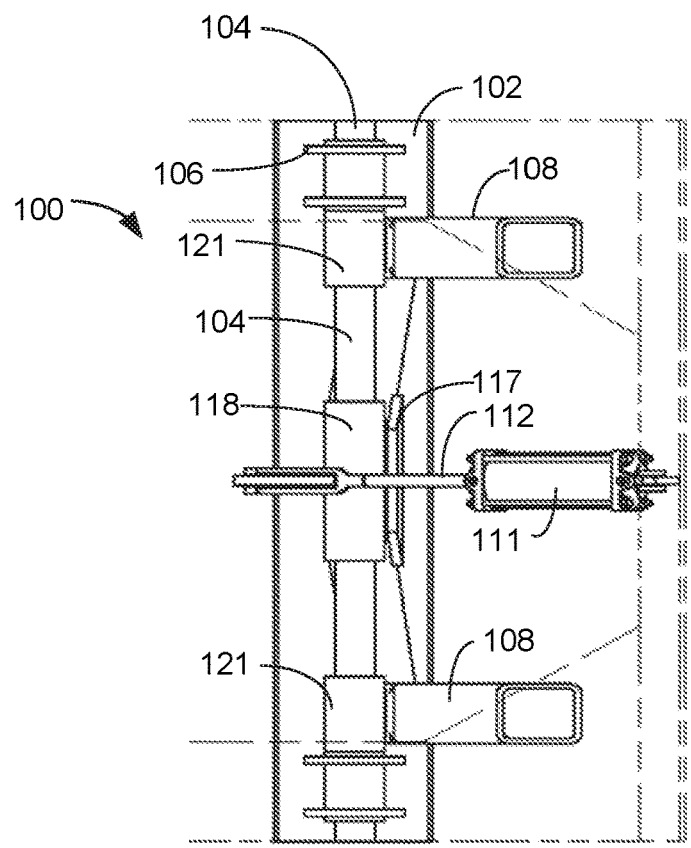
FIG. 3 is a top view of the landing gear of FIG. 1.

FIG. 3 is a top view of the landing gear 100 of FIG. 1, in the deployed position. The stop beams 108 extend from legs 101 (FIG. 1) and are rigidly affixed to the legs 101. The rod 104 and the pad 102 are generally parallel to one another, and when the landing gear 100 is deployed as shown, the rod 104 is disposed directly above the pad 102.

Figure 4:
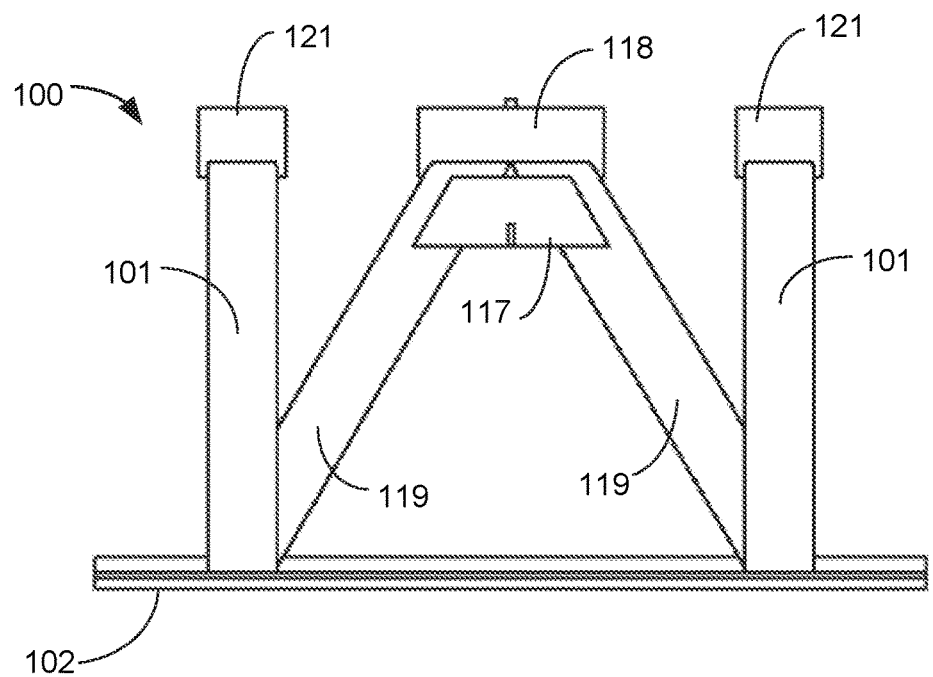
FIG. 4 is a partial front view of the landing gear of FIG. 1.

FIG. 4 is a partial front view of the landing gear 100 of FIG. 1, before the landing gear 100 has been installed on a trailer (i.e., before the landing gear 100 has been installed on the rod 104 (FIG. 1) via the brackets 106 (FIG. 1)).

The outer collars 121 and the central collar 118 each comprise cylindrical tubing with a central opening (not shown) for receiving the rod 104 (FIG. 1). The legs 101 extend generally perpendicularly downwardly from the collars 121 to pad 102. The angled braces 119 extend upwardly at an angle from the legs 101, and meet at and are rigidly affixed to the central collar 118. The support plate 117 is welded to the angled braces 119. The collars 121 and 118, the legs 101, the braces 119, the support plate 117, and the pad 112 comprise a rigid one-piece weldment in the illustrated embodiment.

Figure 5:
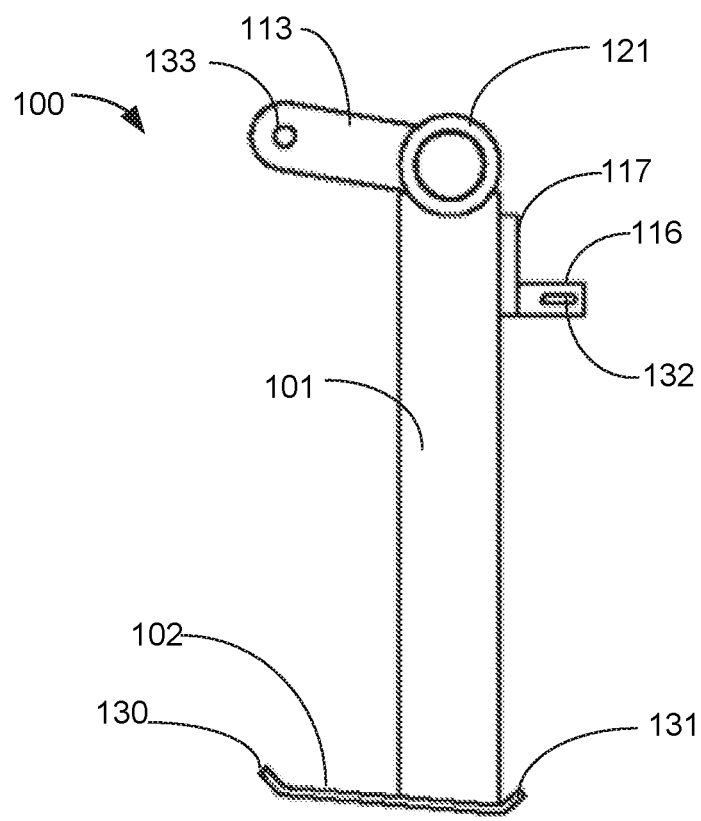
FIG. 5 is a side view of the landing gear of FIG. 1.

FIG. 5 is a side view of the landing gear 100 of FIG. 4. The extension 113 extends rearwardly from the outer collar 121, at an angle of about 100 degrees to the leg 101. The extension 113 comprises an opening 133 used to connect the rod 112 of the pneumatic cylinder 111 to the extension 113 so that the cylinder 111 can rotate the landing gear 100. The extension 113 is welded to the outer collar 121 in one embodiment.

The pad 102 comprises a thin sheet of steel, with a forward edge 131 and a rearward edge 130, the forward edge 131 and rearward edge 130 each angled upward at an angle of about 45 degrees to the pad 102. The pad 102 is disposed at an angle of about 85 degrees to the leg 101 in the illustrated embodiment.

The tab 116 extends from the support plate 117 and comprises a slot 132 extending from the tab 116. The slot 132 receives a hook of a spring (not shown) that is used to pull the landing gear 101 forward during deployment.

What is claimed is:

1. An air powered landing gear for supporting a front end of a trailer, comprising:
   a cylindrical rod secured by a plurality of brackets to an underside of the trailer;
   a collar assembly configured to receive and rotate around the rod, the collar assembly comprising a central collar and two outer collars, the two outer collars disposed outwardly from and spaced apart from the central collar, each of the two outer collars and the central collar comprising cylinders rotatable around the rod;
   a leg assembly rigidly affixed to and extending downwardly from the collar assembly, the leg assembly comprising two legs, each leg rigidly affixed to and extending downwardly from one of the two outer collars, the leg assembly further comprising a pair of angled braces rigidly affixed to and extending between the central collar at upper ends of the angled braces and the legs at lower ends of the angled braces;
   a pneumatic cylinder extending between the trailer and the leg assembly, the pneumatic cylinder configured to rotate the landing gear from a deployed position, wherein the landing gear supports the front end of the trailer, to a stowed position, wherein the landing gear is rotated upwardly toward the trailer.

2. The air powered landing gear of claim 1, the leg assembly further comprising a pad extending between the two legs, the pad configured to contact the ground when the landing gear is in a deployed position.

3. The air powered landing gear of claim 2, the pad comprising a thin sheet of metal with an upwardly angled forward edge and an upwardly angled rearward edge.

4. The air powered landing gear of claim 1, further comprising a stop beam extending from each of the two legs upwards and forward at an angle, a lower end of each stop beam rigidly affixed to a leg, an upper end of each stop beam configured to contact the underside of the landing gear when the landing gear is in the deployed position.

5. The air powered landing gear of claim 4, further comprising a support plate rigidly affixed to and between the angled braces on a forward side of the braces.

6. The air powered landing gear of claim 5, further comprising a tab extending from the support plate, the tab configured to attach to a spring, the spring extending between the tab and the trailer, the spring configured to pull the landing gear forward against the stop beams when air pressure is removed from the pneumatic cylinder, thus assisting in the deploying of the landing gear.

7. The air powered landing gear of claim 3, the pneumatic cylinder comprising a rod that extends from a first end the pneumatic cylinder, the rod rotatably affixed to an extension extending rearwardly from the central collar at an angle to the legs.

8. The air powered landing gear of claim 6, wherein the pneumatic cylinder is rotatably affixed to the trailer at a second end of the pneumatic cylinder via a bracket attached to a cross member welded to a main frame of the trailer.

* * * * *